March 18, 1924.
A. G. F. KUROWSKI
1,487,168
TYPEWRITING MACHINE
Original Filed Nov. 12, 1919   6 Sheets-Sheet 1
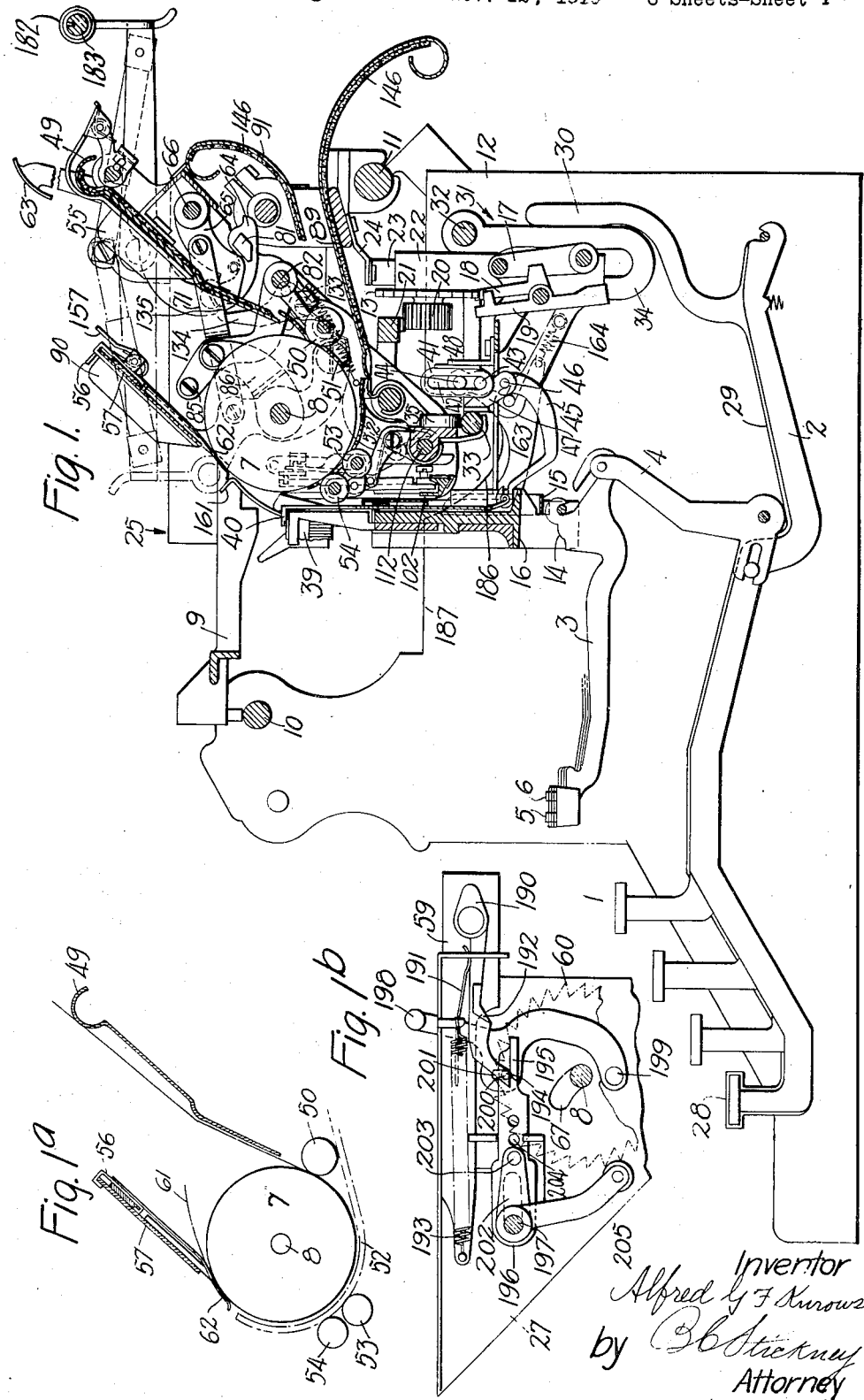

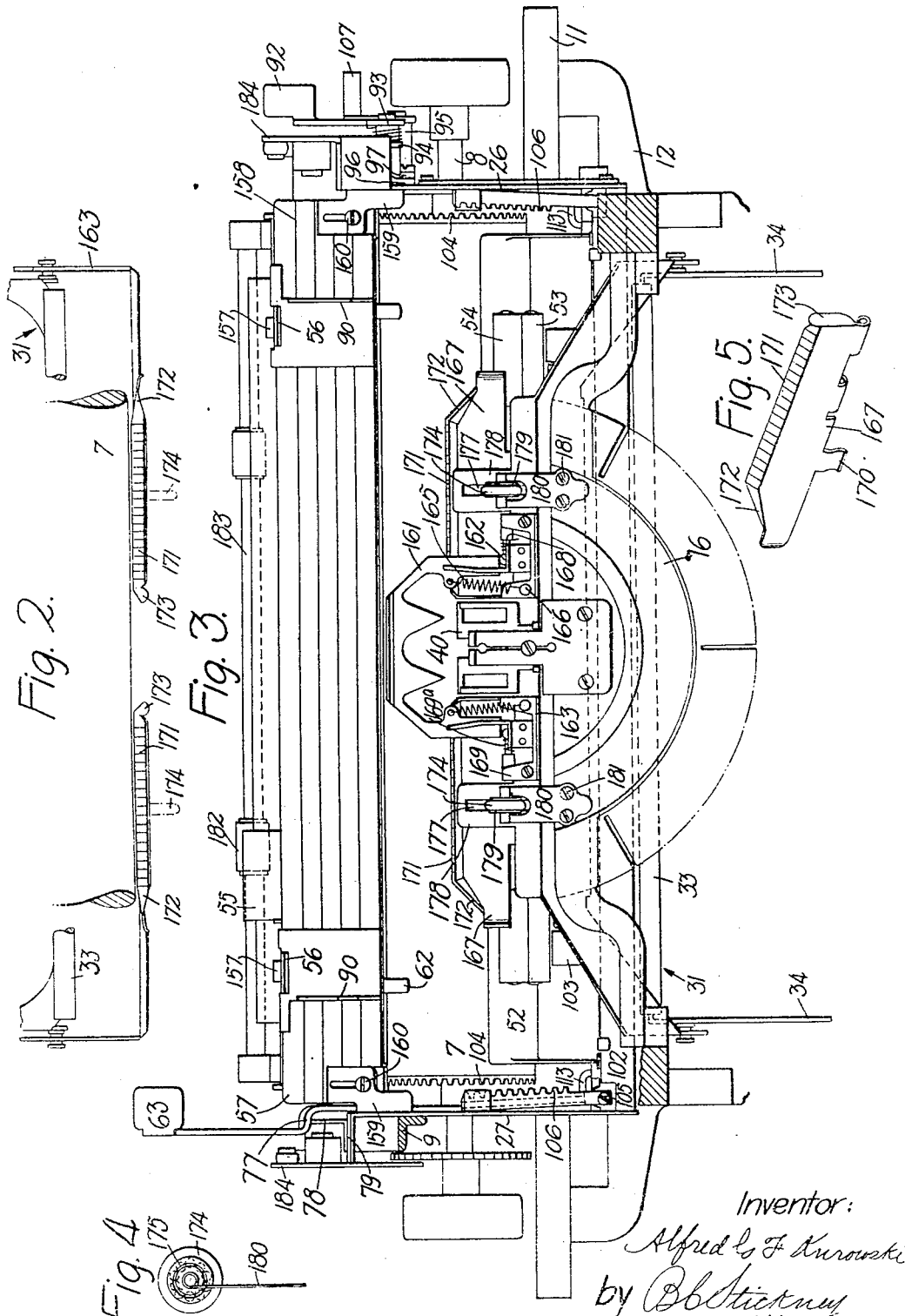

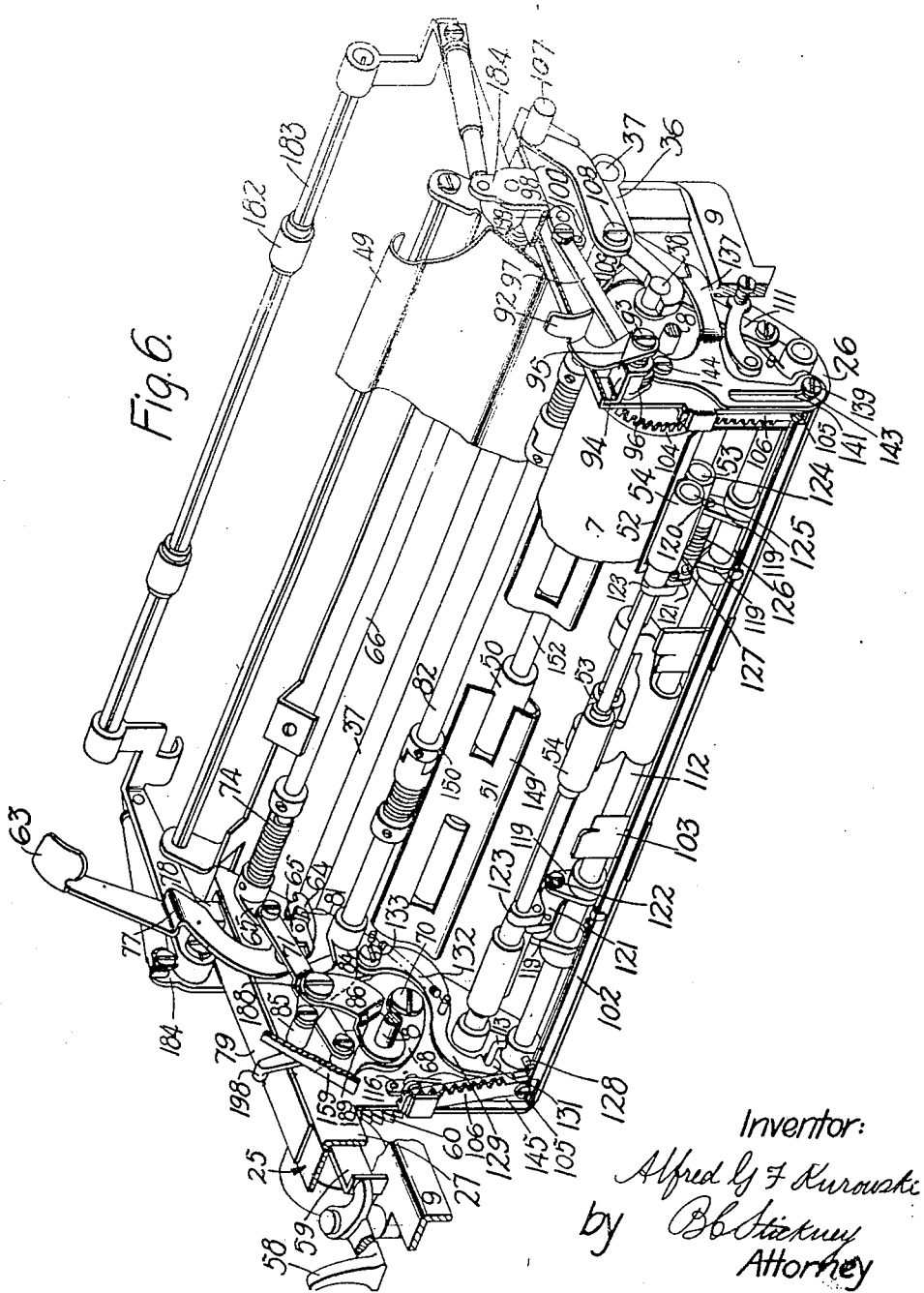

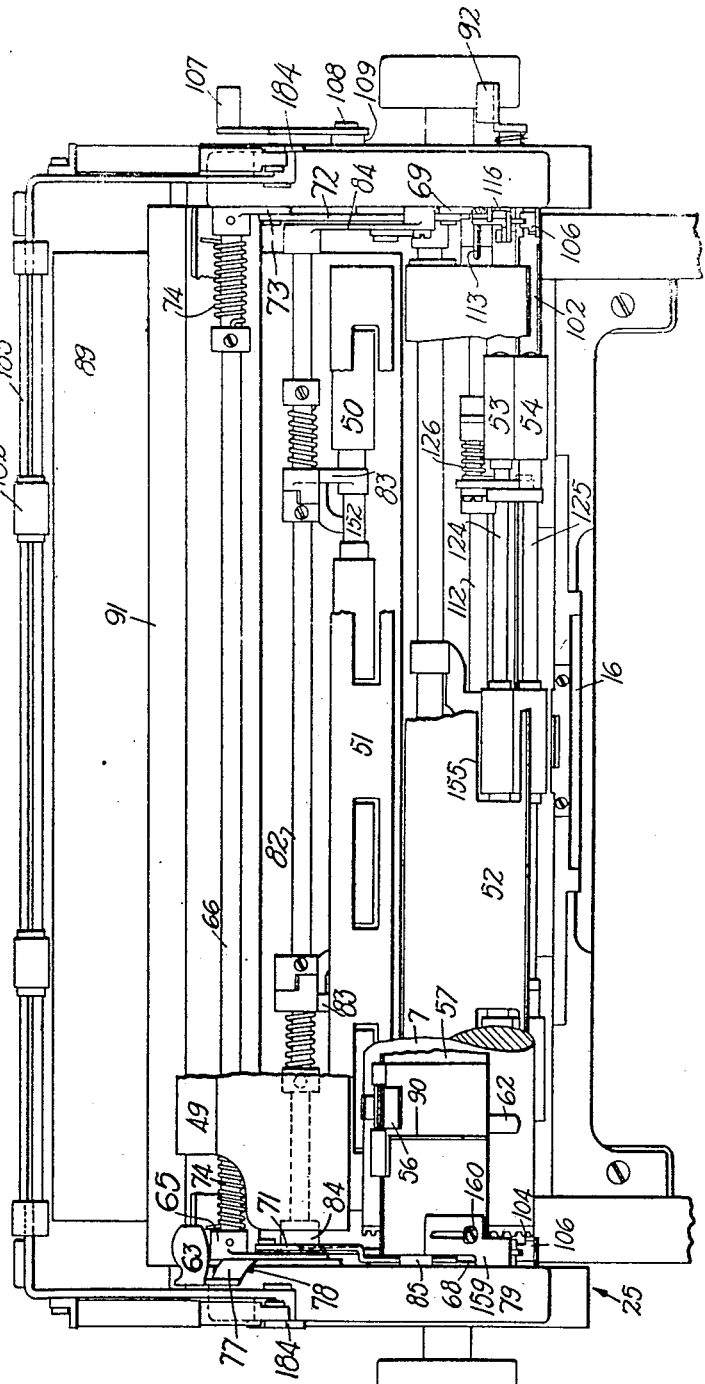

March 18, 1924.
A. G. F. KUROWSKI
TYPEWRITING MACHINE
Original Filed Nov. 12, 1919    6 Sheets-Sheet 5
1,487,168
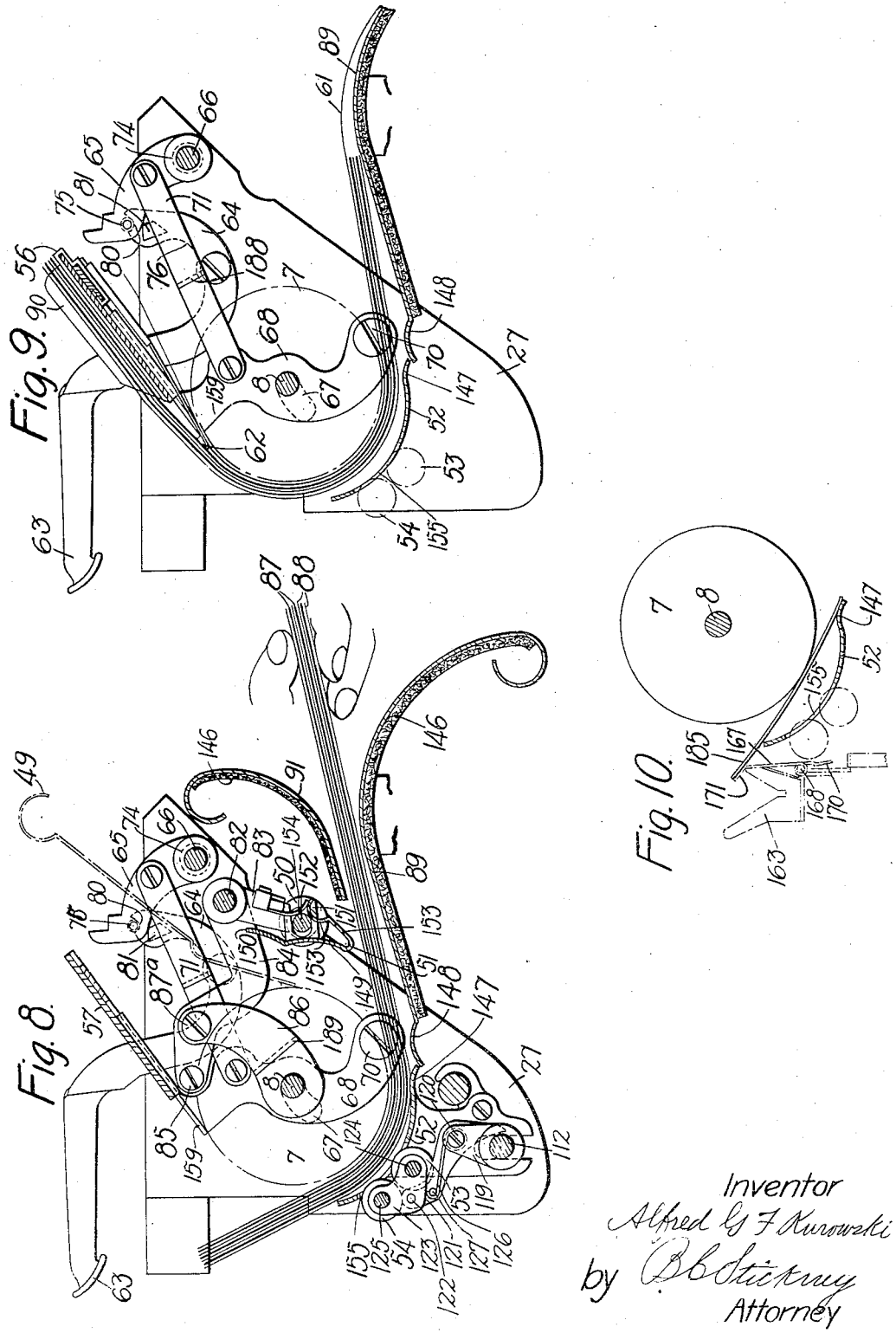

March 18, 1924.
A. G. F. KUROWSKI
1,487,168
TYPEWRITING MACHINE
Original Filed Nov. 12, 1919   6 Sheets-Sheet 6
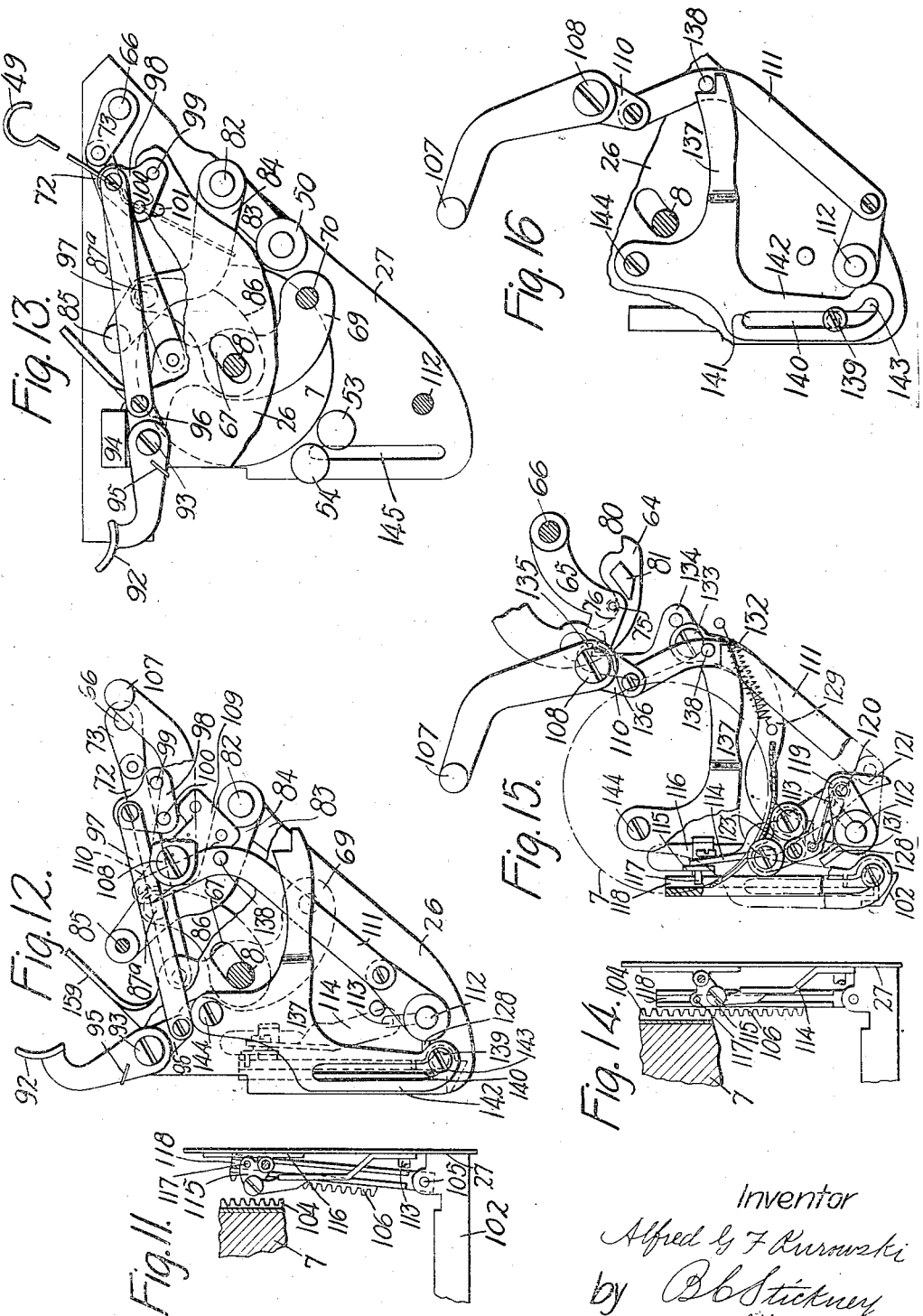
Inventor
Alfred G. F. Kurowski
by B. C. Stickney
Attorney Patented Mar. 18, 1924.

1,487,168

UNITED STATES PATENT OFFICE.

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPEWRITING MACHINE.

Application filed November 12, 1919, Serial No. 337,394. Renewed October 29, 1921. Serial No. 511,455.

*To all whom it may concern:*

Be it known that I, ALFRED G. F. KUROWSKI, a citizen of the United States, formerly a citizen of Germany, residing in Brooklyn Borough, in the county of Kings, city and State of New York, have invented certain new and useful Improvements in Typewriting Machines, of which the following is a specification.

This invention relates to typewriting machines, and is herein disclosed as applied to an Underwood standard typewriter.

In many places, especially large offices, it is often desired to have machines for doing certain special kinds of work which frequently needs to be done, and yet the work is often such that any one kind of the special work will only call for the use of a machine suited for that work a short time each day or week, as the case may be. This work often varies widely in character, such as writing on cards of various descriptions, sizes and thicknesses; on envelopes of unusual thickness or comprising metal clasps; pamphlets which are bound by metal or other fastenings; papers which are held together with metal clasps, especially such papers as it is desired to make a great number of carbon copies of; labels; and stencils, such as are used in mailing or addressing machines. It is also often desired to have a machine suitable for use as a condensed billing machine, even where condensed billing or work of that type is not frequently used in the office.

According to the present invention, a single typewriting machine, embodying the principal advantages of the Underwood standard typewriting machine, may include features which are especially adapted to be used for all of the purposes mentioned above, as well as other purposes. It has been found possible to incorporate, in a single machine, devices suitable for all of these purposes, and to provide interacting connections such that when the machine is set for one purpose, it is not easily deranged by the typist in adjusting it for another purpose.

In obtaining these and other advantages, it has been found desirable to provide a platen which may be shifted rearwardly away from the usual ribbon vibrator and other mechanism, to enable a thick pack of work-sheets to be inserted between the platen and the feed-rolls. The machine may be so devised as to include two paper tables at the rear, one for inserting sheets in the ordinary run of work, while the other table may be used for inserting a thick pack of sheets or a pamphlet. One of the paper tables may be adapted to guide, and at times hold, a record sheet which may be also held by fingers at the front of the platen, thus enabling such record sheet to be detained while other sheets are inserted therearound and over the other paper table, with the result that condensed billing is readily effected.

The device may also include connections whereby separation may be effected between the platen and the feed-rolls to a less extent for inserting a less number of sheets or a single sheet, and this may be effected by moving the platen away from the feed-rolls.

The invention may also include a card-holder, which is normally disconnected from the platen, but which is adapted to be connected thereto for line-spacing purposes, and is also adapted to receive cards of various sizes at a plurality of points along its length. There may be interconnections between the platen-moving device and the card-holder-connecting device to prevent the typist from attempting to utilize one when the other is in use. Thus, the connections prevent a wrecking of the machine by improper use.

To facilitate the introduction of work-sheets at the front, there may be provided a special form of wing-scale adapted to deflect the work-sheets rearwardly, and having a scale engraved thereon which is easily readable.

The device may also include a collating table above the platen, which may carry the aforesaid fingers, and which may shift with the shifting platen when separation is effected between the platen and the feed-rolls, thus enabling work-sheets to be collated upon the table and to be gaged thereon before the platen seizes them against the feed-rolls, the typist being confident that they will not be deranged when the platen moves against the feed-rolls. The device may also include front or upper feed-rolls above the printing line, which may, however, be thrown back out of the way when not in use.

It has been found that all these devices may be incorporated in a machine having a frame which is only slightly modified from the usual Underwood standard frame. Moreover, the line-space mechanism, including the lever for varying its throw and the detent, need not be radically modified from the one usually found in such machines.

A further advantage arises from the fact that the machine is so organized that in order to supply a demand for a machine to do any special work, only the parts that are necessary for that particular work may be fitted to the machine for delivery to the customer. Hence, a relatively small stock of machine bodies can be made to supply demands for a great variety of special machines, since any set of special parts may be promptly placed upon a machine body, and the parts not needed in any particular instance may be simply omitted from that machine.

Other features and advantages will hereinafter appear.

In the accompanying drawings,

Figure 1 is a sectional side view, largely diagrammatic, of an Underwood standard typewriting machine, showing the present invention as applied thereto.

Figure 1ª is a sectional side view, similar to Figure 10, but showing a record-sheet inserted and lying upon the rear paper-table, and a thick pack of work-sheets inserted over the bottom paper-table.

Figure 1ᵇ is an end view of the carriage, showing some details of the line-spacing device.

Figure 2 is a diagrammatic plan view of the platen and the wing-scales together with the mounting of the latter.

Figure 3 is a front view of the typewriting machine, many parts being omitted or broken away in order to bring out clearly the relationship between the platen, the wing-scales and associated mechanism.

Figure 4 is a side view of a roller-bearing for a wing-scale guide.

Figure 5 is a perspective view from the rear of the right wing-scale.

Figure 6 is perspective view of the carriage, with many parts omitted and broken away.

Figure 7 is a plan view of the parts shown in Figure 6.

Figure 8 is a sectional side view, showing the platen withdrawn and a thick pack of work-sheets being inserted around the platen.

Figure 9 is a similar view, but showing a record-sheet also inserted around the platen in a machine in which the rear paper-table is omitted.

Figure 10 is a diagrammatic side view of the platen, apron and wing-scales, showing a stiff work-sheet being inserted.

Figure 11 is a fragmentary rear view, partly in section, of one end of the card holder, and the means for connecting it to the platen.

Figure 12 is a view of the right-hand end of the shift frame, showing the parts in normal position.

Figure 13 is a view similar to Figure 12, but with some parts broken away, and showing the platen moved back by the finger-piece, which moves it slightly away from the feed-rolls.

Figure 14 is a view similar to Figure 11, but showing the card holder connected to the platen.

Figure 15 is a view similar to Figure 12, but showing the finger-piece actuated to connect the card holder to the platen.

Figure 16 is a view similar to Figure 15, but showing the lock made effective by the advance of the platen when the card holder is connected thereto.

In the usual Underwood typewriting machine, character keys 1, when depressed, carry down key-levers 2 to swing type-bars 3, by means of bell-cranks 4, so that upper and lower-case types 5 and 6 print against the front of the platen 7, journaled by means of an axle 8 in a carriage 9. The carriage herein illustrated rests upon the usual front rail 10 and upon a rear rail 11, which resembles the usual Underwood rear rail, but is set considerably lower down in the frame 12, being centered about the height of the top of the escapement wheel 13.

As the type-bars 3 approach the platen, heels 14 upon them strike a universal bar 15, which is slidably mounted upon a segment 16 and is carried upon a rocking frame 17 at its rear, with the result that as the universal bar moves rearwardly it actuates the usual loose and solid dogs 18 and 19 to alternately engage the escapement wheel 13, permitting the escapement wheel to rotate on the return stroke of the universal bar. The escapement wheel 13 controls the carriage 9 by the usual pinion 20, connected by one-way pawls, not shown, to the escapement wheel 13. To hold the carriage, a rack 21 meshes with the pinion 20, tending to turn the pinion because the carriage is constantly under the tension of a spring barrel 22, which draws on a band 23 connected to a lug 24 fast on the body of the carriage.

As the carriage 9 is drawn along, a platen frame 25, having end plates 26 and 27 in which the platen is journaled, is carried along with it. Normally, the machine writes in lower-case, and, when it is desired to write in upper-case, a shift-key 28, on the front end of a shift-key-lever 29, is depressed, so that an upper arm 30 fast to the key-lever rocks a shift-frame 31 around a shaft 32 in the frame of the typewriter, thereby lifting upwardly the usual shift rail 33 at the front end of bell-cranks 34, with the result that a roll, running on the rail 33 and forming part of the platen frame 25, lifts the platen frame 25, the alignment of the platen being preserved by the usual rock arms 36 at the ends of the usual shaft 37 and engaging pins 38 in the ends 26 and 27.

To enable the printing to be effected by a printing ribbon 39 of the usual kind, a ribbon carrier 40 is adapted to lift the ribbon to the printing point every time the universal bar 15 is moved rearwardly. To effect this, the universal bar carries the usual actuator 41 comprising openings 42, which are adapted to selectively engage pins 43 and 44 upon the upper end of a vibrator 45, pivoted at 46 upon a small bracket 47 secured to the shift rail 33. The mechanism may also include the usual silencing arm, not shown, adapted to hold the shiftable actuator 41 at an intermediate point on the support 48 upon which it shifts, with the result that the actuation of the universal bar is ineffective to raise the ribbon,—this silencing arm being frequently used in stenciling operations.

When it is desired to write upon an ordinary work-sheet inserted in the machine, the work-sheet may be inserted over an upper rear paper-table 49 (Figures 1 and 1ª), occupying somewhat nearly the position of the usual rear paper-table, and may be passed downwardly over said paper-table between a rear feed-roll (or feed-rolls) 50 and the platen, and then around beneath the platen, guided by a deflector 51 to an apron 52, which guides it upwardly and forwardly to front feed-rolls 53 and 54, from which it passes upwardly past the ribbon carrier 40. Such a work-sheet may be aligned by one or more adjustable edge gages 55, lying upon the rear paper-table, one form of which is shown in the patent to William L. Gumprecht, No. 1,227,262, dated May 22, 1917, and may have its leading edge gaged against one or both of the end gages 56, which are adjustable along an upper front aligning or collating table 57. The typing on a work-sheet thus inserted may proceed in any usual or desired manner, and the work-sheet may be advanced by the usual line-space lever 58, which is adapted to drive the usual slide 59 and so turn the line-space wheel 60, fast upon the axle 8 of the platen.

If it is desired that the work-sheet first inserted shall be used as a record sheet, such as is sometimes used in condensed billing, the work-sheet may be inserted as is the work-sheet 61 at Figure 1ª, in which the work-sheet, instead of passing over the front paper-table 57, passes beneath resilient fingers 62, which project downwardly from the bottom of the paper-table 57 and press upon the platen with sufficient force to create the friction needed to detain the work-sheet 61 while other work-sheets are passed therearound in a manner which will be presently described.

When the work-sheet has thus been inserted and held in position by the fingers 62, in order to provide for the insertion of other work-sheets, particularly a thick pad or pack thereof, or comparatively stiff sheets of cardboard or the like, a finger-piece 63, pivoted upon the end 27, may be drawn forward, so that its lower end 64 swings from the Figure 1 position to the Figure 8 position, to carry upwardly a rock arm 65 fast upon a shaft 66, with the result that the platen 7 is displaced or moved bodily upwardly and rearwardly away from the apron 52 and front feed-rolls 53 and 54, from the Figure 1 to the Figure 8 or 9 position, its axle 8 sliding in slots 67 in the end plates 26 and 27, these slots being suitably curved. To thus move the platen, the platen axle, instead of being journaled directly in the platen-frame ends 26 and 27, is journaled in swinging arms 68 and 69, which are pivoted upon shouldered screws 70, fast in the ends 26 and 27, with the result that, by drawing the arms 68 and 69 rearwardly, the platen is carried clear of the feed-rolls 53 and 54. To thus carry the platen rearwardly, the arms 68 and 69 are connected by links 71 and 72 to rock arms fast upon the shaft 66, one of these being the rock arm 65, heretofore mentioned, and the other being a rock arm 73, also fast upon said shaft. The shaft 66 is journaled in the ends 26 and 27, and normally holds its rock arms 65 and 73 so that the links 71 and 72 are nearly or dead center, with the result that the blows of the type heads upon the platen are received almost squarely upon the shaft 66. To hold the shaft 66 with its rock arms 65 and 73 in this position, the shaft is normally swung forwardly by strong springs 74 coiled about it and swinging the rock arms downwardly until a follower 75 of the rock arm 65 rests upon a hollow 76 in the lower end 64 of the finger-piece 63. The finger-piece 63 holds its end in this position because it comprises a bent portion 77, which, in this position, rests upon a lug 78 fast upon the cover plate 79 of the end 27. When the finger-piece 63 is swung to the Figure 8 or 9 position, the follower 75 comes to rest in a hollow 80 in the end of the lower portion 64, and is detained there. In order to assist in raising the rock arm 65, the lower portion 64 may also comprise a lug 81, adapted to ride under the bottom of the rock arm 65 and lift the arm, turning the shaft.

In adidtion to moving bodily or displacing the platen upwardly and rearwardly to the Figure 8 or Figure 9 position, the finger-piece 63 concomitantly displaces the rear feed-roll 50 and is adapted to swing the feed-roll 50 rearwardly and upwardly from the Figure 1 to the Figure 8 position. To effect this, the feed-roll, which normally occupies approximately the position of the usual rear feed-roll of the Underwood machine, is provided with a special mounting, which is herein shown as a swinging shaft 82, having arms 83 fast thereon, the shaft being carried by swinging arms 84, pivoted at 85 in the ends 26 and 27 above the platen and well toward the top of the ends. In the normal position of the platen, the shaft 82 occupies a low-down position, seen in Figure 1, but when the finger-piece 63 is actuated to draw the platen rearwardly, a floating link 86, at each end of the platen journaled on the platen axle and pivotally connected at 87ª to its swinging arm 84, swings the arm 84 upwardly, thereby carrying the feed-roll 50 to the Figure 8 position. This carries the feed-roll 50 rearward away from the platen and upward well out of the way of a thick bunch of carbon sheets 87 and work-sheets 88, which may be inserted, as shown in Figure 8, from the rear over a lower rear paper-table 89, forming part of the main frame of the carriage and lying close to the rail 11, with the result that the carbon sheets 87 and work-sheets 88 pass freely beneath the platen 7 over the apron 52, and have ample space to pass freely upward between the platen and the front feed-rolls 53 and 54, and may be collated upon the paper-table 57 by the end gages 56 and the side gages 90, which are fast to their respective end gages 56.

In order to positively guide the carbon sheets 87 and work-sheets 88 clear of the deflector 51, an inverted table or deflector 91, fixed to the carriage frame, may curl upwardly from a point near the deflector 51 in its Figure 8 position, forming a funnel-shaped opening or flaring throat to guide the work-sheets 88 and carbon-sheets 87 to the platen 7. The record sheet is detained against slipping, because the platen, when moved back, pinches it against the lower end of the table 49. When a thick pack of sheets 87, 88 has been thus collated upon the already-inserted record sheet 61, the platen may clamp the work-sheets against the feed-rolls by moving the finger-piece 63 rearwardly, so that the restoring springs 74 bring the platen back to printing position, whereupon typing may proceed in the ordinary manner, the relationship of the sheets not being changed during the restoration of the platen, since the paper-table 57 and the fingers 62 move practically as a unit with the platen as it returns.

If it is desired to insert a smaller number of work-sheets than the thick pack 87, 88, the platen may be moved bodily or displaced a less distance clear of the feed-rolls 53 and 54, by means of a finger-piece 92, fast upon a short shaft 93, which is journaled in a small bracket 94 upon the end piece 26. When the finger-piece 92 is drawn forward, against the tension of a spring 95, from the Figure 6 or Figure 12 position to the Figure 13 position, a rock arm 96 fast upon the shaft 93 pushes rearwardly a link 97 which is pivoted to it, and thereby rocks a bell-crank 98 pivoted at 99 to the end 26, with the result that a lug or pin 100, fast upon the bell-crank and projecting through an opening 101 in the end piece 26 and underlying the link 72, lifts the link 72 to a small extent, thereby withdrawing the platen from the Figure 12 to the Figure 13 position, thus opening a small space between the platen and the feed-rolls 53 and 54, and likewise opening a small space between the platen and the feed-roll 50. This gives room for the insertion of a few sheets over the paper-table 49 (or paper-table 89), around the platen and between it and the feed-rolls. Said work-sheet or work-sheets may be gaged by any of the heretofore described gages, or any other suitable gages in any manner desired. When the work-sheets thus inserted have been suitably gaged, the finger-piece 92 may be returned, thus allowing the platen-restoring springs 74 to become effective. The finger-piece 92 remains in the Figure 13 position until it is returned by hand, because the link 97 is practically on dead center in that position.

The machine herein disclosed is also well adapted for the writing of cards, especially such as stencils cards, and, for this purpose, is provided with a card-holding device comprising a bar 102, herein shown as a channel bar lying close to the back of the segment 16 and comprising suitable clips or clamps 103, which may be adjustably mounted there 1 to hold, in any desired position, by its end a card of any length within the limits of the length of the bar 102. The bar 102 extends substantially the length of the platen and is normally at its lower position, seen in Figure 1, in which it stands just above the ends of the universal bar 15, that is to say, just above the rear ends of the wing type-bars 3, said wing type-bars not being shown herein. In order to give sufficient room for the channel bar 102 to rise behind the segment 16, the segment is of special construction, having a flat back substantially flush with the ribbon carrier 40, and may be constructed and supported as shown in my co-pending application No. 315,372, filed August 5, 1919 (now Patent No. 1,425,024, dated August 8, 1922).

In order to connect the channel bar 102 to the platen, so that it will rise at the rotating of the platen, as by the actuation of the line-space lever 58, the platen is provided with crown gears 104 at each end thereof, substantially flush with the periphery of the platen, and the channel bar 102 has pivoted thereto at each end at 105 a rack 106, which normally stands at the Figure 11 position clear of the adjacent gear 104, but is adapted to be swung to the Figure 14 position, where it meshes with the adjacent gear, so that the channel bar 102 rises at the rotation of the platen. To effect this meshing of the racks 106 with the gears 104, there is provided a finger-piece 107, fast on the end of a stub shaft 108, which is journaled in a bracket 109 fast upon the end 26, with the result that the drawing forward of the finger-piece 107 to the Figure 15 position rocks downwardly a rock arm 110, fast to the shaft 108, pushing downwardly a link 111, which is adapted to rotate the shaft 112 and operate the devices for connecting the racks 106 with the gears 104. To effect this connection, the shaft 112, which is journaled in the ends 26 and 27, has fast thereto at each end within said ends a rock arm 113, each rock arm 113 being pivotally connected by a link 114 to a bell-crank 115 journaled upon a bracket 116, which is fast to the adjacent end 26 or 27. The connections are such that when the finger-piece 107 is drawn forward, the bell-cranks 115 are rocked downwardly, with the result that a pin 117 in each bell-crank, riding in a slot 118 in the adjacent rack 106, swings its rack from the Figure 11 to the Figure 14 position. Not only does the drawing forward of the finger-piece 107 connect the card-carrying channel bar 102 to the platen, but it simultaneously moves the feed-rolls 53 and 54 rearwardly to a position clear of the path of the channel bar. For this purpose, the shaft 112 has fast thereto pairs of rock arms 119, carrying short shafts 120, on which are journaled feed-roll-supporting arms 121, the shaft 120 extending between pairs of the rock arms 119. Instead of supporting the feed-rolls 53 and 54 directly, the arms 121 carry studs or screws 122 on which are pivoted yokes 123, in which are journaled the shafts 124 and 125 of the feed-rolls 53 and 54, respectively, and the feed-rolls are held against the platen by springs 126 coiled around the shafts 120 and bearing against lugs 127 on the arms 121.

In order to hold the card-carrying channel bar 102 in its normal depressed position, except when connected to the platen, there is provided, at each end of the shaft 112, a pin 128 which normally overlies the bar 102, as shown in Figure 6, but which swings to the Figure 15 position, clear of the bar, when the finger-piece 107 is drawn forward. In order to lock the finger-piece 63 against actuation, and hold the platen 7 against being withdrawn rearwardly when the channel bar 102 is connected to the platen, there is provided a locking device comprising a floating link 129, which is drawn forward by the turned-over rock arm 113 upon the shaft 112, the link being provided with a lip 131 to partly encircle said rock arm. The link 129 is normally drawn rearwardly and upwardly by a spring 132, which is anchored in the end 27. The link 129 is pivoted at 133 to a swinging hook 134, Figures 1 and 15, having a turned-over end 135 which normally stands clear of a lug 136, projecting from the rock arm 65, but which, upon the turning of the shaft 112 rearwardly, is drawn rearwardly by the spring 132 to make the end or lip 135 effective to overlie the lug 136 in the path thereof.

In order to hold the actuated finger-piece 107 against return to disconnect the racks 106 from the gears 104, unless the card-holding channel bar 102 is in its normal Figures 1, 6, 11 or 12 position, there is provided a locking arm 137, which lies clear of a pin 138 upon the link 111 in the actuated position of the finger-piece 107, but which, at the rise of the bar 102, is moved to effective position to engage the pin 138 and thereby lock the link 111 against return. To effect this, there is provided a screw 139 extending through a right-hand slot 140 in the end plate 26, in which the channel bar 102 is guided, said screw forming a cam follower which lies within a cam slot 141 in a bell-crank extension 142 of the locking arm 137. Normally, the screw 139 lies in the curved bottom end 143 of the cam slot 141, swinging the arm 137 downwardly around its pivot 144. When the channel bar 102 rises, the screw 139 rides out of the end 143 into the straight portion of the slot, thereby swinging the locking arm 137 from the Figure 15 to the Figure 16 position. To guide the channel bar 102 at the end 27, there is provided a slot 145, similar to the slot 140.

The lower rear paper-table 89 is curved downwardly at its rear end to form the bottom end of the funnel or throat through which the sheets 87, 88 are inserted, and, to minimize the noise due to typewriting, both the paper-table 89 and the deflector or guide 91 are shown as having fast thereto, as by glue, a felt or fabric backing 146 which deadens the vibrations of the metal bodies of these parts.

The apron 52 is provided at its rear end with a hump 147, forming a deflector to turn slightly upwardly sheets inserted from the front, so that they will clear the front end 148 of the paper-table 89, which is also formed as a hump to deflect the sheets over the junction of the hump 147. Owing to the fact that the hump 148 is fast to the carriage while the hump 147 shifts with the platen frame, the humps are independent of each other, but it is found that the form of humps illustrated is satisfactory for inserting sheets from either the front or the rear.

The deflector 51 is formed with a lower curved surface 149, which is adapted to curve sheets closely to the platen, and is provided with an upper portion 150 which lies behind the paper-table 49 and guides sheets onto the curved portion 149. The deflector 51 is shown as supported by U-shaped brackets 151, which ride upon the shaft 152 upon which the feed-rolls 50 are journaled. The deflector 51 is held in place thereon by a bent-up portion 153, which springs behind the shaft 152 when the deflector is in place and bears against a somewhat resilient arm 154, which is fast to the rock arm 83 on which the shaft 152 is carried. The structure of this feed-roll 50 and deflector 51 is shown in some detail in my co-pending application No. 328,019, filed October 2, 1919. When the arms 84 are moved upwardly by the displacement of the platen, the deflector 51, as well as the rear feed-roll 50, will be displaced with the platen and will be carried rearwardly and upwardly away from the lower rear paper-table 89 out of the path of the sheets 87 and 88 inserted over this lower rear paper-table, as shown in Figure 8.

The apron 52 is provided with openings 155 within which the feed-rolls 53 and 54 normally ride to press upon the platen. When the feed-rolls 53 and 54 are drawn rearwardly by the actuation of the handle or finger-piece 107, the feed-rolls may ride out upon the surface of the apron 52.

The fingers 62 may be supported by the end gages 56, and said end gages may be slidable along the table 57 and held in position thereon by locking finger-pieces 157, in a manner set forth in some detail in my co-pending application No. 322,630, filed September 9, 1919. The collating table or front paper-table 57 is provided with rulings 158, which may serve for aligning sheets when it is not desired to have them extend up to the end gages 56. The table 57 is carried on extensions 159 of the swinging arms 68 and 69, so as to be displaceable with the platen, in a manner set forth in some detail in said application No. 322,630, and may be adjusted thereon by headed screws 160. To facilitate the front insertion of sheets, a card holder and wing scale is utilized, which embodies some of the features shown in the patent to Helmond, No. 1,302,161. In said patent, a U-shaped stiff frame 161, forming a bridge clear of the top of the ribbon carrier 40 at the limit of its throw, is pivoted at 162 upon a frame 163, which rises and falls with the shift frame 31 under tension of a spring 164. The frame 161 is pressed by springs 165 in such a way that it either springs strongly toward the platen or strongly away from the platen, the springs 165, for this purpose, being anchored at 166 beneath the pivots 162 of the U frame 161. This frame when sprung forward furnishes ample room for the front insertion of work-sheets.

In order to enable work-sheets to be readily inserted past the wing scales, special wing scales are shown as herein provided comprising bodies 167, journaled upon rods 168, which are journaled in suitable ears 169 of the frame 163. The wing scales 167 are normally pressed forward by light springs 169$^a$, which encircle the pivot rods 168, but are prevented from swinging actually against the platen by depending arms 170 which extend down behind the frame 163 and form stops for the wing scales 167. To deflect work-sheets inwardly toward the platen, each wing scale has a top member 171 bent outwardly away from the platen and having scale lines analogous to the usual wing-scale lines engraved thereon, the slant of the members 171 being such that the scale rulings are easily visible, although the slant of the members 171 toward the platen is considerable. Each top member 171 bends down at the outer end of its wing scale and gradually diminishes in a slanting extension 172 until it merges with the body of the scale. To make sure that the ends of the sheets which extend past the side of the ribbon carrier 40 do not catch the inner ends of the wing scales, each inner end is bent outwardly to form a narrow deflecting portion or wing 173, which lies close to but clear of the ribbon carrier, and may be bent to about the same degree as the usual ribbon carrier. To ease the strain or load which may be put upon the scales 167 when a heavy work-sheet is being inserted from the front, each scale may be held in its rearward position practically bearing against the platen by a roller 174, which is mounted in ball-bearings 175 (Figure 4) and has a narrow tread extending through a slot 177 in a rather stiff post or plate 178 forming a narrow upward extension of the body or frame 163, said extensions each forming a stop for limiting the forward throw of its end wing scale. The rollers 174 also comprise narrow treads 179 running outside the margins of the slots 177 upon the posts 178. The bearings 175 of the rollers themselves are carried upon fairly stiff plates 180 held by screws 181 to the thick portions of the segment 16. The rollers, therefore, always bear upon and form a roller-bearing for the wing scales 167 as the scales shift up and down with the shift frame, as the wing scales 167 are pressed outwardly by thick packs of work-sheets.

In order to hold work-sheets against the platen above the printing line, there may be provided upper front feed-rolls 182, which are slidably mounted on a cross-rod 183, adapted to be thrown backwardly clear of the collating table 57 and out of the way to the Figure 6 position (shown also in full lines in Figure 1), but which is provided with end arms journaled upon ears 184 on the platen frame, forming a bail which permits these feed-rolls to be thrown forward to effective position above the printing line (as shown in broken lines in Figure 1) in the manner more clearly set forth in my Patent No. 1,229,180, dated June 5, 1917. These rolls may form a card-holder which may be especially useful when a thick card board 185 is inserted from the front, as shown diagrammatically in Figure 10, after the platen has been moved rearwardly by the bringing forward of the finger-piece 63. The proportions of the apron 52 are such that a special work-sheet of the character described will then be just about tangent to the platen if it rests upon the hump 147 and upon the front of the apron 52. In extending out in front of the apron, as diagrammatically shown in Figure 10, it just rests comfortably on the top extensions 171 of the wing scales 167. Such a work-sheet may be inserted thus and bent into curved form for writing by the returning of the platen when the finger-piece 63 is moved rearwardly. Figure 10 equally illustrates the manner in which a thick pamphlet may be inserted and bent around the platen.

The structure thus described provides suitable means for inserting envelopes comprising metal clasps, and papers which are held together with metal clasps. The bridge 161, together with the wing scales described, makes the machine an excellent label-writing device. The bridge 161 when sprung forward just supports the front of the work-sheet shown in Figure 10. To enable the platen to occupy the maximum length in the carriage, the link 71 and the adjacent link 86 may have their ends overlapping by offsetting them by bends 188, 189.

In the construction shown in the drawings, when the card-holding bar 102 is connected to the platen to be line-fed upwardly thereby, as hereinbefore described, only the rearward lower front feed-rolls 53 are caused to ride away from the platen 7 on the lower side of the apron 52, the forward lower front feed-rolls 54 being left in engagement with the platen through the openings 155, as is shown in Figure 15, thereby providing for or facilitating the insertion, if desired, of a record sheet over the upper rear paper-table 49, and around beneath the platen at the back of a sufficiently thin card or other sheet carried by and fed upwardly by the card-holding bar 102, and also the similar insertion, if desired, of other sheets over the lower rear paper-table 89 and around beneath the platen, such record sheet or other sheets being advanced by the platen and lower front feed-rolls 53, with which the rear feed-rolls 50 and the upper front feed-rolls 182 may co-operate.

The slide 59 drives the line-space wheel 60 by the usual pawl 190, which is pivoted to it and is pressed down by the leaf-spring 191, so that it tends to carry the nose 192 of the pawl into the teeth of the line-spaced wheel. Normally, the slide 59 is drawn forward by the usual spring 193, so that the end 194 of the pawl rests upon a movable shelf 195, formed upon a slide-link 196, supported on a pivot 197 upon the adjacent end plate 27.

In order to vary the throw of the line-space wheel by the pawl 190, a handle 198 is pivoted upon the end plate 27 at 199, and is provided with a pin 200, which rests in a slot 201 in the link 196. The handle 198 may be moved rearwardly from its Figure 1$^b$ position, thereby carrying the link 196 rearwardly, thus varying the length of throw of the pawl 190, which takes place before the end 194 slips off the end of the shelf 195 to permit the pawl 190 to engage the wheel 60. To permit the link 196 to slide, it is provided with an opening 202, through which the pivot pin 197 passes, the opening being elongated sufficiently to permit the desired sliding of the link. The link may be detained at any one of three positions by a spring detent 203, which is adapted to seat itself in any one of the three openings 204 upon the link 196. The pin 197 may serve as a pivot for the spring detent 205, which keeps the platen from rotating, except when being actually turned; it being found that the slots 67, when located in the positions described, permit the platen to move in them without unduly swinging the spring detent 205.

It has been found that the usual Underwood frame 12 need not be modified much more than indicated above, to accommodate the described mechanism. It is found, however, that a somewhat larger U 186 in the side frame 187 is desirable to enable the card-holding channel bar 102 to lie close behind the back of the segment 16. A satisfactory tabulating device for use in a machine of this character is shown in my application No. 297,655, filed May 16, 1919, (now Patent No. 1,356,158, of October 19, 1920), in which the front of the machine is somewhat modified.

Thus a single form of frame may form the foundation for machines adapted to do any of the kinds of work enumerated above,—any device not needed being omitted from the mechanism.

Variations may be resorted to within the scope of the invention, and portions of the improvements may be used without others.

Having thus described my invention, I claim:

1. In a front-strike typewriting machine, the combination with a traveling carriage, of a paper-apron extending upwardly in front, a platen adapted to be withdrawn rearwardly from said apron, so that a stiff work-sheet resting on the front of the apron and on the rear portion of the apron is about tangent to the platen, and wing-scales adjacent the front of the platen in its forward position and having bent-over tops substantially even with the stiff work-sheet when so tangent to the platen.

2. In a front-strike typewriting machine, the combination with a traveling carriage, including a platen, of a pair of rear paper-tables adapted to deliver work-sheets to the platen to be advanced by the platen from said paper-tables, and a normally ineffective card-holding device adapted to be connected to the platen to advance a card with the platen concomitantly with the advancing of said work-sheets by the platen.

3. In a front-strike typewriting machine, the combination with a traveling carriage, including a platen, of a pair of rear paper-tables adapted to deliver work-sheets to the platen, feed-rolls, means for moving the platen away from the feed-rolls, to enable the introduction of work-sheets by said tables, a card-holding device, normally disconnected from the platen, means for connecting the device to the platen, and connections for locking said moving means when the connecting means is actuated.

4. In a front-strike typewriting machine, the combination with a revoluble platen, of devices for holding a record-sheet both at the back and front while an outer sheet is being inserted, said record-sheet and outer sheet being adapted to be advanced by the rotation of the platen, separate paper-tables for the insertion of said sheets, and a card-holding device adapted to be connected to the platen to be fed upwardly as the platen is rotated to advance said sheets, said device being normally disconnected from the platen.

5. In a front-strike typewriting machine, the combination with a revoluble platen, of devices for holding a record-sheet both at the back and front while an outer sheet is being inserted, separate paper-tables for the insertion of said sheets, a card-holding device adapted to be connected to the platen, but normally disconnected therefrom, feed-rolls, means for withdrawing the platen from said feed-rolls, means for connecting the card-holding device to the platen, and connections whereby either means is inoperable when the other is actuated.

6. In a typewriting machine, the combination with a type-segment, of a traveling carriage, including a platen behind the segment, so that there is an opening to permit a card to extend vertically down from the platen, behind the segment, a card-holding device connected to the segment, and adapted to be sprung against the platen to hold the card thereagainst, and a card-holding bar normally disconnected from the platen, and adapted to be connected thereto to line-space a card lying against the platen.

7. In a typewriting machine, the combination with a platen and a collating table above the platen, of a frame in which the platen is mounted, a bail pivoted on said frame and adapted to swing clear of said table, and front feed-rolls on said bail adapted to ride upon work-sheets between the printing point and the table.

8. In a typewriting machine, the combination with a platen and a collating table above the platen, of a frame in which the platen is mounted, a bail pivoted on said frame and adapted to swing clear of said table, front feed-rolls on said bail adapted to ride upon work-sheets between the printing point and the table, an axle for said platen slidable in slots in said frame, a connection between the axle and the table, so that the platen and table move together, and fingers upon the table adapted to hold a work-sheet upon the platen while it is moving.

9. In a typewriting machine, the combination with a platen, of a frame, means for bodily moving said platen in said frame to permit the insertion of thick work-sheets, fingers moving with the platen to hold another work-sheet upon the platen while it moves, a card-holding device normally disconnected from the platen, but adapted to be connected thereto, and means for preventing bodily movement of the platen in said frame when the card-holding device is connected to the platen.

10. In a typewriting machine, the combination with a platen, of a frame, means for bodily moving said platen in said frame to permit the insertion of a thick work-sheet, fingers moving with the platen to hold another work-sheet upon the platen while it moves, a card-holding device normally disconnected from the platen, but adapted to be connected thereto, means for moving the platen in the frame a less distance to permit the insertion of a thinner work-sheet, and means for preventing bodily movement of the platen in said frame when the card-holding device is connected to the platen.

11. The combination with a platen, a platen frame in which the platen is bodily movable, a rear paper-table and a front collating table co-operating with the platen, of a card-holding device normally disconnected from the platen, means for connecting the latter to the platen, and means for preventing bodily movement of the platen in said frame when the card-holding device is connected to the platen.

12. The combination with a platen, a rear paper-table and a front collating table cooperating with the platen, of a card-holding device normally disconnected from the platen, means for connecting the latter to the platen, a frame having ends in which the platen is slidable, means for sliding the platen in said ends, and an interlock between the sliding means and the connecting means for preventing sliding movement of the platen in said frame when the card-holding device is connected to the platen.

13. The combination with a platen, a rear paper-table and a front collating table cooperating with the platen, of a card-holding device normally disconnected from the platen, means for connecting the latter to the platen, a frame having ends in which the platen is slidable, connections whereby the collating table slides with the platen, and means for preventing sliding movement of the platen in said frame when the card-holding device is connected to the platen.

14. The combination with a platen, of a plurality of rear paper-tables, a card-holding device normally disconnected from the platen, means for connecting the latter to the platen, a feed-roll for holding upon the platen work-sheets inserted over a certain one of said tables, another feed-roll normally in the path of the card-holding device, and means for moving the latter feed-roll out of the way of the card-holding device by connecting the card-holding device to the platen.

15. In a typewriting machine, the combination with a platen, and a plurality of feed-rolls bearing thereon, of a paper-table, ends in which the platen is slidable, means for moving one feed-roll by moving the platen in the ends, a card-holding device normally disconnected from the platen, and means for moving another feed-roll by connecting the card-holding device to the platen.

16. In a typewriting machine, the combination with a platen, and a plurality of feed-rolls bearing thereon, of a paper-table, ends in which the platen is slidable, means for moving one feed-roll by moving the platen in the ends, a card-holding device normally disconnected from the platen, means for moving another feed-roll by connecting the card-holding device to the platen, and a collating table movable with the platen and adapted to hold a work-sheet upon the platen as it moves.

17. In a typewriting machine having a bodily movable platen, the combination with a card-holding device normally disconnected from the platen, of a front paper-table for the platen, a rear paper-table for the platen, and means for concomitantly connecting the card-holding device to the platen and locking the platen against bodily movement.

18. In a typewriting machine having a platen, the combination with a card-holding device always disconnected from the platen, of three paper-tables for said platen, and a card-holding device normally disconnected from the platen, but adapted to be connected thereto.

19. In a typewriting machine, the combination with a platen, and a card-holding device adapted to be connected thereto, of a rear paper-table, a feed-roll adapted to guide work-sheets around the platen from said paper-table, a front feed-roll normally lying in the path of the card-holding device, and means for moving the front feed-roll, independently of the rear feed-roll, out of the path of said device.

20. In a typewriting machine, the combination with a platen, and a case-shift frame in which it is journaled, of a card-holding device in said frame, disconnected from the platen, but adapted to be connected to it, and a card-holder always disconnected from the platen, but adapted to shift with said frame, and to be swung to and from the platen.

21. In a typewriting machine, the combination with a platen and a frame, of an axle for the platen slidable in said frame, two paper-tables for said platen forming part of the frame, a paper-table for the platen movable in the frame, a card-holding device shifting with the frame, means for sliding the platen by its axle in the frame, connections whereby one paper-table slides with the axle, and mountings for the other paper-tables holding them independent of the sliding of the platen.

22. In a typewriting machine, the combination with a platen and a frame, of an axle for the platen, slidable in said frame, two paper-tables for said platen, forming part of the frame, a paper-table for the platen movable in the frame, a card-holding device shifting with the frame, means for sliding the platen by its axle in the frame, connections whereby one paper-table slides with the axle, mountings for the other paper-tables, holding them independent of the sliding, and a deflector independent of the paper-tables, but sliding when the platen slides.

23. The combination with a revoluble platen and a frame in which it is slidable, of feed-rolls normally bearing against the platen, means for moving one of said feed-rolls away from the platen when the platen slides, a card-holding device adapted to be connected to the platen, and means for moving another feed-roll by connecting said device to the platen.

24. The combination with a revoluble platen and a frame in which it is slidable, of feed-rolls normally bearing against the platen, means for moving one of said feed-rolls away from the platen when the platen slides, a card-holding device adapted to be connected to the platen, means for moving another feed-roll by connecting said device to the platen, and means for effecting separation between the platen and all the feed-rolls to insert a work-sheet around the platen.

25. The combination with a platen, of normally ineffective means at the back of the platen for detaining a work sheet, normally effective means at the front of the platen for detaining the work-sheet upon the platen, a card-holding device normally disconnected from the platen, connections for moving the platen to make the first detaining means effective, a finger-piece for connecting the card-holding device to the platen, and connections such that when either the first detaining means or the card-holding device is effective, the other is inoperable.

26. In a front-strike typewriting machine, the combination with a traveling carriage, including a platen, of a rear paper-table to deliver work-sheets to the platen, an apron for guiding the work-sheets beneath the platen, feed-rolls for the platen adjacent said apron, means for bodily moving the platen in the carriage away from said apron and feed-rolls, a card-holding device in the carriage normally disconnected from the platen, and means for connecting the card-holding device to the platen to be line-fed thereby and concomitantly locking said platen-moving means.

27. In a front-strike typewriting machine, the combination with a traveling carriage, including a platen, of a rear paper-table to deliver work-sheets to the platen, an apron for guiding the work-sheets beneath the platen, a front feed-roll for the platen adjacent said apron, means for bodily moving the platen in the carriage away from said apron and front feed-roll, a card-holding device in said carriage normally disconnected from the platen, said front feed-roll being normally in the path of the card-holding device, and means for connecting the card-holding device to the platen to be line-fed thereby and concomitantly locking said platen-moving means and moving said front feed-roll rearwardly out of the path of the card-holding device.

28. In a typewriting machine, the combination with a revoluble platen, of a platen frame, means for bodily moving the platen in said frame to provide for the insertion of a thick pack of work-sheets, detaining fingers mounted to move with the platen to hold another work-sheet upon the platen while it moves, a card-holding device normally disconnected from the platen but connectible thereto to be line-fed thereby, means for preventing bodily movement of the platen in said frame when the card-holding device is connected to the platen, and means for preventing line-feed movement of the card-holding device during said bodily movement of the platen.

29. In a typewriting machine, the combination with a revoluble platen, of a platen frame in which the platen is bodily movable, a rear paper-table and a front collating table co-operative with the platen, a card-holding device normally disconnected from the platen, means for connecting the card-holding device to the platen to be line-fed thereby, means for preventing bodily movement of the platen in said frame when the card-holding device is connected to the platen, and means for preventing line-feed movement of the card-holding device during said bodily movement of the platen.

30. In a typewriting machine, the combination with a revoluble platen, of a rear paper-table and a front collating table co-operative with the platen, a card-holding device normally disconnected from the platen, means for connecting the card-holding device to the platen to be line-fed thereby, a frame having ends in which the platen is displaceable, means for displacing the platen in said ends, and connections whereby either of said means is inoperable when the other is actuated.

31. In a typewriting machine, the combination with a revoluble platen, of a rear paper-table and a front collating table co-operative with the platen, a card-holding device normally disconnected from the platen, means for connecting the card-holding device to the platen to be line-fed thereby, a frame having ends in which the platen is displaceable, means for displacing the platen in said ends, connections whereby the collating table is displaceable with the platen, and connections whereby either of said means is inoperable when the other is actuated.

32. In a typewriting machine, the combination of a bodily movable platen, a card-holding device normally disconnected from the platen, a front paper-table for the platen, a rear paper-table for the platen, means for concomitantly connecting the card-holding device to the platen to be line-fed thereby and locking the platen against bodily movement, and means for preventing line-feed movement of the card-holding device during said bodily movement of the platen.

33. In a typewriting machine, the combination with a revoluble platen and a shiftable platen frame, of an axle for the platen displaceable in said frame, two rear paper-tables for the platen, a front paper-table for the platen displaceable with the platen in said frame, a card-holding device shifting with said frame, means for displacing the platen by its axle in said frame, and mountings for the rear paper-tables holding them independent of the displacing of the platen.

34. In a typewriting machine, the combination with a revoluble platen and a shiftable platen frame, of an axle for the platen displaceable in said frame, an upper and a lower rear paper-table for the platen, a front paper-table for the platen displaceable with the platen in said frame, a card-holding device shifting with said frame, mountings for the rear paper-tables holding them independent of the displacing of the platen, and a deflector for the upper rear paper-table displaceable upwardly away from the lower rear paper-table concomitantly with the displacing of the platen.

35. In a front-strike typewriting machine, the combination with a revoluble platen, of front and rear feed-rolls, means for bodily moving the platen rearwardly away from the front feed-roll, connections for automatically moving the rear feed-roll at the same time as and faster than the platen to open a space between all the feed-rolls and the platen, a card-holding device normally disconnected from the platen, means for connecting the card-holding device to the platen to be line-fed thereby, and connections for locking said platen-moving means when the connecting means for the card-holding device is actuated.

36. In a front-strike typewriting machine, the combination with a revoluble platen, of front and rear feed-rolls, means for bodily moving the platen rearwardly away from the front feed-roll, connections for automatically moving the rear feed-roll at the same time as and faster than the platen to open a space between all the feed-rolls and the platen, a card-holding device normally disconnected from but connectible to the platen to be line-fed thereby, said front feed-roll being normally in the path of said card-holding device, and means for moving said front feed-roll out of the path of the card-holding device by connecting the card-holding device to the platen.

37. In a front-strike typewriting machine, in combination, a traveling carriage, a platen frame shiftable in the carriage, a revoluble platen displaceable upwardly and rearwardly in the platen frame, an upper rear paper-table fixed in the platen frame at the introductory side of the platen and adapted at its lower end to clamp a work-sheet against the displaced platen, a lower rear paper-table mounted on the carriage, an upper front paper-table displaceable in the platen frame by the displacement of the platen so as to maintain substantially the same relation with the platen and provided with means for clamping a work-sheet against the platen at the delivery side thereof above the writing line, a paper apron below the platen and partly at the front thereof and away from which the platen is displaceable, a card-holding device at the front of the platen below the writing line shiftable with the platen frame and normally disconnected from the platen but connectible thereto to be line-fed upwardly thereby, a lower front feed-roll adjacent the apron normally in the path of the card-holding device but withdrawable rearwardly out of its path and away from which the platen is displaceable, a rear feed-roll between the rear paper-tables and displaceable upwardly away from the lower rear paper-table and rearwardly away from the platen by the displacement of the platen, a releasable upper front feed-roll to run on the platen above the writing line and below the front paper-table, means for resiliently pressing work-sheets against the platen at the front thereof between the said upper and lower front feed-rolls, a paper deflector for the upper rear paper-table adjacent the rear feed-roll and displaceable therewith, manually operable means including a finger-piece for concomitantly displacing the platen and the front paper-table and the rear feed-roll and the paper deflector, other manually operable means including a second finger-piece for concomitantly withdrawing the lower front feed-roll out of the path of the card-holding device and connecting the latter to the platen to be line-fed upwardly thereby, a locking device operable by said second finger-piece to lock the first finger-piece against platen-displacing movement when the card-holding device is connected to the platen, a second locking device operable by the second finger-piece to prevent upward movement of the card-holding device when it is disconnected from the platen, a third locking device operable by upward line-feed movement of the card-holding device to lock the second finger-piece against movement to disconnect the card-holding device from the platen except in the normally depressed position of the card-holding device, and yet other manually operable means including a third finger-piece for displacing the platen to a less extent from the apron and the front and rear feed-rolls.

38. In a front-strike typewriting machine, in combination, a traveling carriage, a platen frame shiftable in the carriage, a revoluble platen displaceable upwardly and rearwardly in the platen frame, an upper rear paper-table, a lower rear paper-table, an upper front paper-table displaceable in the platen frame by the displacement of the platen so as to maintain substantially the same relation with the platen, a paper apron below the platen and partly at the front thereof and away from which the platen is displaceable, a card-holding device at the front of the platen below the writing line shiftable with the platen frame and normally disconnected from the platen but connectible thereto to be line-fed upwardly thereby, a lower front feed-roll adjacent the apron normally in the path of the card-holding device but withdrawable rearwardly out of its path and away from which the platen is displaceable, a rear feed-roll between the rear paper-tables and displaceable upwardly away from the lower paper-table and rearwardly away from the platen by the displacement of the platen, a paper deflector for the upper rear paper-table adjacent the rear feed-roll and displaceable therewith, manually operable means including a finger-piece for concomitantly displacing the platen and the front paper-table and the rear feed-roll and the paper deflector, other manually operable means including a second finger-piece for concomitantly withdrawing the front feed-roll out of the path of the card-holding device and connecting the latter to the platen to be line-fed upwardly thereby, a locking device operable by said second finger-piece to lock the first finger-piece against platen-displacing movement when the card-holding device is connected to the platen, a second locking device operable by the second finger-piece to prevent upward movement of the card-holding device when the latter is disconnected from the platen, and a third locking device operable by upward line-feed movement of the card-holding device to lock the second finger-piece against movement to disconnect the card-holding device from the platen except in the normally depressed position of the card-holding device.

39. In a front-strike typewriting machine, in combination, a traveling carriage, a platen frame shiftable in the carriage, a revoluble platen displaceable upwardly and rearwardly in the platen frame, an upper rear paper-table adapted at its lower end to clamp a work-sheet against the displaced platen, a lower rear paper-table, an upper front paper-table displaceable in the platen frame by the displacement of the platen so as to maintain substantially the same relation with the platen and provided with means for clamping work-sheets against the platen at the delivery side thereof above the writing line, a paper apron below the platen and partly at the front thereof and away from which the platen is displaceable, a card-holding device at the front of the platen below the writing line shiftable with the platen frame and normally disconnected from the platen but connectible thereto to be line-fed upwardly thereby, a lower front feed-roll adjacent the apron normally in the path of the card-holding device but withdrawable rearwardly out of its path and away from which the platen is displaceable, manually operable means including a finger-piece for concomitantly displacing the platen and the front paper-table, other manually operable means including a second finger-piece for concomitantly withdrawing the front feed-roll out of the path of the card-holding device and connecting the latter to the platen to be line-fed upwardly thereby, a locking device operable by said second finger-piece to lock the first finger-piece against platen-displacing movement when the card-holding device is connected to the platen, a second locking device operable by the second finger-piece to prevent upward movement of the card-holding device when it is disconnected from the platen, and a third locking device operable by upward line-feed movement of the card-holding device to lock the second finger-piece against movement to disconnect the card-holding device from the platen except in the normally depressed position of the card-holding device.

40. In a front-strike typewriting machine, in combination, a traveling carriage, a platen frame shiftable in the carriage, a revoluble platen displaceable upwardly and rearwardly in the platen frame, an upper rear paper-table, a lower rear paper-table, an upper front paper-table displaceable in the platen frame by the displacement of the platen so as to maintain substantially the same relation with the platen, a paper apron below the platen and away from which the platen is displaceable, a card-holding device at the front of the platen below the writing line shiftable with the platen frame and normally disconnected from the platen but connectible thereto to be line-fed upwardly thereby, a lower front feed-roll adjacent the apron normally in the path of the card-holding device but withdrawable rearwardly out of its path and away from which the platen is displaceable, manually operable means including a finger-piece for concomitantly displacing the platen and the front paper-table, and other manually operable means including a second finger-piece for concomitantly withdrawing the front feed-roll out of the path of the card-holding device and connecting the latter to the platen to be line-fed upwardly thereby.

41. In a typewriting machine, the combination with a type-segment, of a traveling carriage including a platen behind the segment, so that there is an opening to permit a card to extend vertically down from the platen behind the segment, and a yieldable device mounted on the segment to spring towards the platen to hold the card against the platen.

42. In a typewriting machine, the combination with a revoluble platen and a shiftable platen-frame, of an axle for the platen displaceable in said frame, two rear paper-tables for the platen, a front paper-table for the platen displaceable with the platen in said frame, and a card-holding device shifting with said frame.

43. In a typewriting machine, the combination with a revoluble platen and a shiftable platen-frame, of an axle for the platen displaceable in said frame, an upper and a lower rear paper-table for the platen, a front paper-table for the platen displaceable with the platen in said frame, a card-holding device shifting with said frame, and a deflector for the upper rear paper-table displaceable upwardly away from the lower rear paper-table concomitantly with the displacing of the platen.

44. In a typewriting machine, the combination with a revoluble platen and a shiftable platen-frame, of an axle for the platen displaceable in said frame, two rear paper-tables for the platen, a front paper-table for the platen displaceable with the platen in said frame, and a card-holding device shifting with said frame and adapted to be sprung towards the platen to hold a card against the platen.

45. In a front-strike typewriting machine, the combination with a type-segment, of a traveling carriage including a shiftable platen-frame and a revoluble platen behind the segment, so that there is an opening to permit a card to extend vertically down form the platen behind the segment, an axle for the platen displaceable in said frame, two rear paper-tables for the platen, a front paper-table for the platen displaceable with the platen in said frame, a card-holding device shifting with said frame to hold the card against the platen, and a yieldable device mounted on the segment to co-operate with said card-holding device to hold the card against the platen.

46. In a typewriting machine, the combination with a revoluble platen, of feed-rolls to co-operate with the platen, a card-holding device normally disconnected from the platen, means for moving said platen away from said feed-rolls, means for connecting the card-holding device with the platen for operation thereby, and connections for rendering either of said means ineffective when the other is actuated.

ALFRED G. F. KUROWSKI.

Witnesses:
CATHERINE A. NEWELL,
EDITH B. LIBBEY.